United States Patent

Mellen, Jr. et al.

[15] 3,654,984
[45] Apr. 11, 1972

[54] PORCUPINE SHELL MOLDS AND METHOD OF MAKING SAME

[72] Inventors: Edward J. Mellen, Jr., East Cleveland; Edmond M. Baker, Minerva; John M. Webb, Chagrin Falls, all of Ohio

[73] Assignee: said Mellen, by said Baker and said Webb

[22] Filed: Jan. 27, 1970

[21] Appl. No.: 6,241

Related U.S. Application Data

[60] Continuation-in-part of Ser. No. 781,069, Dec. 4, 1968, Pat. No. 3,508,602, which is a Division of Ser. No. 511,129, Dec. 2, 1965, Pat. No. 3,452,804.

[52] U.S. Cl. ................................. 164/26, 164/34, 164/41, 164/361
[51] Int. Cl. .................................................. B22c 9/12
[58] Field of Search ......................... 164/26, 34, 41, 43, 361

[56] References Cited

UNITED STATES PATENTS

| 3,041,131 | 6/1962 | Juras et al. | 164/43 X |
| 3,066,365 | 12/1962 | Moore | 164/43 X |
| 3,166,808 | 1/1965 | Moore | 164/41 X |
| 3,196,506 | 7/1965 | Operhall et al. | 164/26 |
| 3,367,393 | 2/1968 | Lenahan et al. | 164/34 |
| 3,374,825 | 3/1968 | Johnson | 164/43 X |
| 3,452,804 | 7/1969 | Mellen, Jr. et al. | 164/26 |

FOREIGN PATENTS OR APPLICATIONS

| 1,031,587 | 6/1966 | Great Britain | 164/361 |

*Primary Examiner*—R. Spencer Annear
*Attorney*—McCoy, Greene & Howell

[57] ABSTRACT

A thermally insulated, unbacked, porcupine shell mold made by applying to a wax pattern a series of layers of ceramic material, adhering to the ceramic layers in a single application a multiplicity of stiff destructible threadlike fibers with a length of about 0.4 inch to about one inch, said fibers being randomly disposed to project outwardly in closely spaced relation, thereafter applying a plurality of layers of additional ceramic material to cover said fibers and to cause the outer ceramic layers to form projections conforming to the shape of said fibers, and firing the mold to remove the wax and burn out said fibers.

5 Claims, 10 Drawing Figures

INVENTORS
EDWARD J. MELLEN JR.
EDMOND M. BAKER
JOHN M. WEBB
McCoy, Greene & Howell
ATTORNEYS

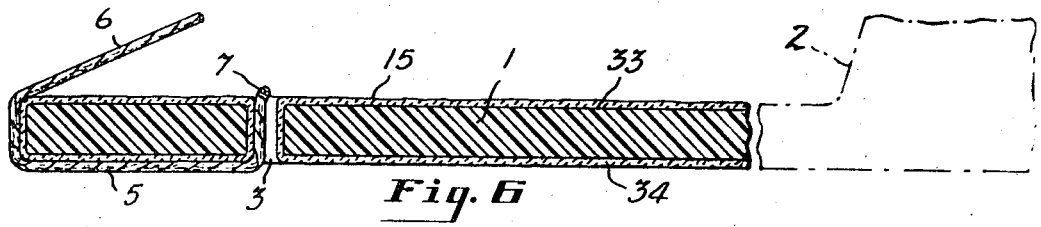
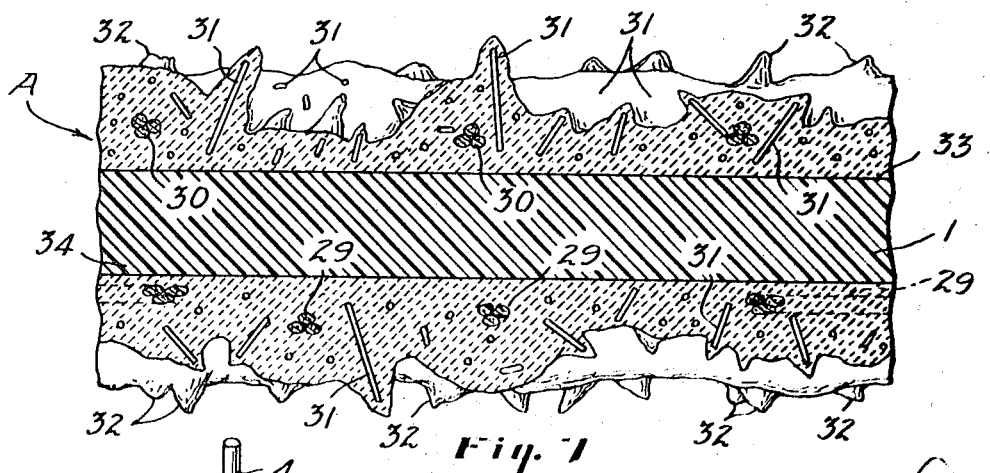
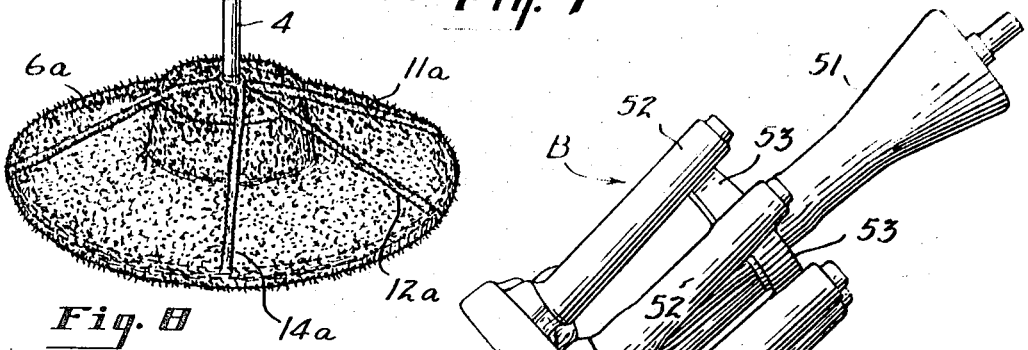
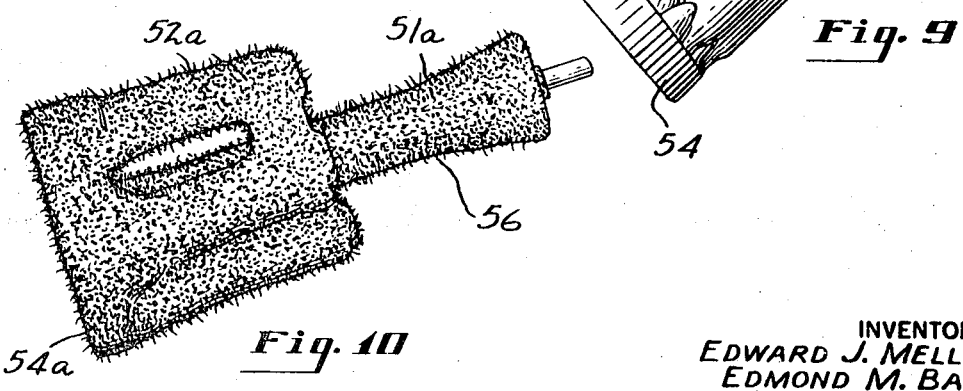
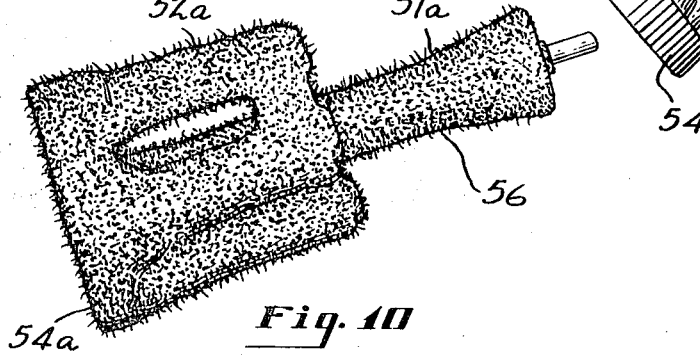
INVENTORS
EDWARD J. MELLEN JR.
EDMOND M. BAKER
JOHN M. WEBB
McCoy, Greene & Howell
ATTORNEYS

PORCUPINE SHELL MOLDS AND METHOD OF MAKING SAME

This application is a continuation-in-part of our copending application Ser. No. 781,069, filed Dec. 4, 1968, now U.S. Pat. No. 3,508,602, which is a division of our copending application, Ser. No. 511,129, filed Dec. 2, 1965, now U.S. Pat. No. 3,452,804.

The present invention relates to unbacked refractory shell molds having improved thermal insulating properties and increased strength produced by repeatedly dipping a removable or destructible pattern in a ceramic slurry and more particularly to porcupine refractory shell molds made by applying short stiff threadlike fibers to a coated pattern before all the ceramic layers have been applied.

Heretofore, refractory shell molds have been produced by repeatedly dipping a pattern of frozen-mercury, wax or other destructible material in a ceramic slurry and drying each layer to produce four to 10 or more layers with a total shell thickness of 0.2 to 0.4 inch or more. If desired, each slurry layer was dusted with dry refractory particles before drying of that layer. After the mold was built up to the desired thickness, the pattern was removed in a suitable manner, as by melting or dissolving it, the mold was fired, and thereafter the mold was preheated and filled with molten metal to effect casting of the desired metal article.

In order to obtain satisfactory results by such shell molding process it was necessary to provide the mold with adequate strength, porosity and resistance to thermal shock and to provide the mold cavity with dimensional accuracy and proper surface finish. The "lost wax" shell molding process was not satisfactory for making some types of articles because of the difficulty in solving these problems. For example, such process was generally considered unsatisfactory for making articles of very large size. Because the shell molds produced in such process by the repeated dipping and drying operations had relatively thin walls, the molds tended to be weak and to have poor thermal insulating properties and, therefore, were unsatisfactory for many casting operations which required backed or reinforced molds or thermally insulated molds. The present invention provides solutions to these problems and makes possible economical production of very large shell molds and/or thermally insulated shell molds by the "lost-wax process" using mass production dipping and drying procedures.

For many years refractory molds have been insulated by surrounding the mold with a backup material or a wrapping of asbestos so that the molds could be preheated and the cooling rate of the metal casting could be properly controlled. It has been known for several years that this procedure adds substantially to the molding costs, but a satisfactory solution to the problem was not known prior to this invention.

The thermal insulating properties of the ordinary shell mold made by repeated dipping and drying operations disclosed in U.S. Pat. No. 2,932,864 are poor because the walls are usually relatively thin and dense. It is known that the thermal insulating properties of such shell molds can be improved by incorporating in one or more layers of the shell mold particles of cork, wood, plastic or other destructible material which burn out to provide a multiplicity of voids in the mold walls. Such voids provide insulating air spaces but are undesirable in that they weaken the mold and tend to interfere with adhesion of one layer to the next adjacent layer. For this reason wood particles, sawdust and the like should not be used to provide insulating air spaces in a shell mold.

The present invention involves the discovery of a way to provide adequate thermal insulation in a shell mold without weakening the mold or interfering with adhesion of the various layers and without creating an excessive number of voids in the mold walls. The invention makes possible rapid and economical formation of an unbacked, thermally insulated, porcupine mold of improved strength with only a single application of stiff destructible threadlike fibers. The porcupine construction permits rapid formation of strong, thick walls with a minimum number of ceramic dips. The process of this invention not only solves the problem of making thermally insulated molds but also solves the problem of producing shell molds of large size.

The problem of producing large shell molds economically with adequate green strength, porosity and resistance to cracking has been recognized for many years, but a simple and practical solution to this problem was not found prior to the present invention. It has now been discovered that excellent shell molds for very large castings can be made in a simple manner by employing destructible threads or fibers to reinforce the green mold, to improve the porosity of the mold, and to reduce the weight of the mold for a given wall thickness. The process of this invention improves both small and large shell molds and makes it possible to cast the metal at room temperature without preheating the shell mold, as was necessary prior to this invention, and without a backing for the shell mold.

When making shell molds by the process of this invention, the prime dip coats may be applied to the pattern in the usual manner, with or without dusting, to provide the shell mold with the desired internal surface characteristics. Thereafter, cords or threads of a suitable destructible material, such as stiff natural or synthetic fibers are secured in outwardly projecting positions to the coated pattern, and additional layers of refractory material are applied in a conventional manner to build up the desired thickness of the shell wall. The destructible threads may be applied by a sprinkling or "flocking" operation after dipping the coated pattern in the ceramic slurry.

When making a large shell mold, destructible fibers, twine or other rope may be applied to the partially formed shell mold so that the ceramic slurry subsequently applied will penetrate the interstices thereof. The rope is preferably wound around the pattern to provide a network of closely spaced portions or strands reinforcing the mold, and additional destructible material is preferably sprinkled on the mold in the form of short threads or fibers to provide additional green strength and to improve further the porosity of the mold after firing. In this way it is possible to maintain dimensional accuracy and to avoid damage to the shell mold during the dipping, dusting, drying and pattern removal operations and to provide a durable mold which is strong enough for pouring of a very heavy casting, which can withstand high thermal shocks, and which, nevertheless, has very high permeability. Upon firing of the "green" shell mold, the rope or twine is burned out leaving passages for flow of gas into or out of the mold. These passages are smaller than the external dimensions of the rope or twine because the ceramic material penetrates the interstices of the cord and, therefore, the passages do not materially weaken the mold. The short destructible threads applied to the shell mold are also burned out to provide threadlike voids or passages. If a final seal coat is applied, these voids provide thermal insulation.

The ceramic impregnated rope or twine and/or the destructible threads or fibers burn out much slower than the wax pattern and retain their strength long enough to resist cracking of the mold during the wax removal process.

An object of the invention is to provide a simple, reliable and economical process for making unbacked shell molds with relatively thick walls which have improved strength and thermal insulating properties.

These and other objects, uses and advantages of the invention will become apparent from the following description and claims and from the drawings, in which:

FIG. 6 is a fragmentary vertical sectional view of the rope-reinforced pattern of FIGS. 2 and 3;

FIG. 7 is an enlarged fragmentary sectional view of the shell mold made by the process of FIGS. 2 to 6 prior to firing of the mold;

FIG. 8 is a perspective view of the completed shell mold made by the above process;

FIG. 9 is a perspective view of another form of conventional wax pattern on a reduced scale; and FIG. 10 is perspective view of the finished shell mold formed on the wax pattern of FIG. 9 by the process of this invention.

Figure 1:
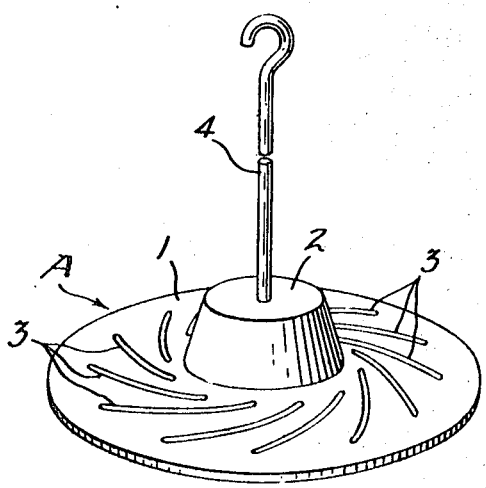
FIG. 1 is a perspective view showing a conventional wax pattern on a reduced scale.

Referring more particularly to the drawings, FIG. 1 shows a conventional wax pattern A in the form of a large turbine blade wheel having a flat disc-shaped portion 1, a tapered hub portion 2, and a series of regularly spaced curbed blade slots 3 of generally uniform width. A conventional supporting hook 4 is embedded in the pattern.

When making a relatively large shell mold by the process of this invention, one or two prime dip coats may be applied to the wax pattern, and the coated pattern may then be reinforced by a rope network, which may be applied by extending portions of the rope through the slots 3. FIGS. 2 through 6 show one way in which the reinforcing twine or other rope may be applied; it being understood that many other arrangements of rope are also suitable.

Figure 2:
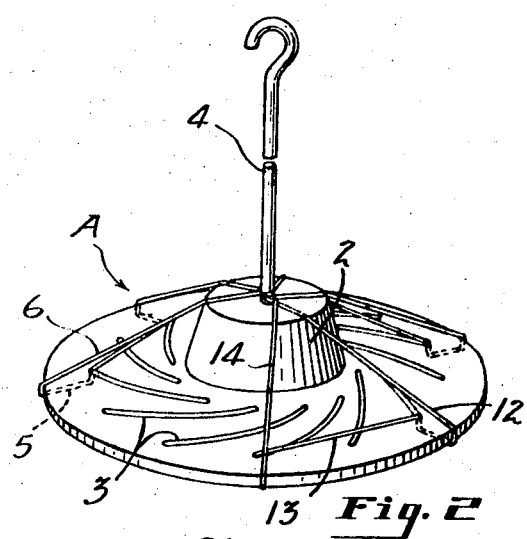
FIG. 2 is a perspective view showing a ceramic-coated wax pattern with a supporting rope attached thereto according to the process of the invention.
Figure 3:
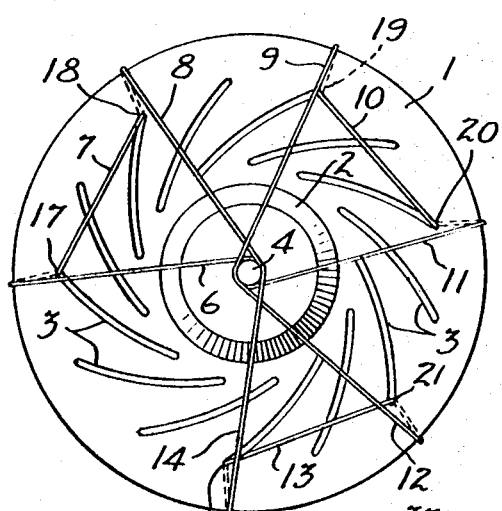
FIG. 3 is a top plan view of the rope-reinforced pattern of FIG. 2.

FIG. 2 shows how the supporting ropes may be attached to the base of the hook member 4. Thus, the rope may be extended radially outwardly from the base of the hook over the portion 1 to he outer margin of the pattern, under the pattern to the adjacent slot 3, and through that slot to another slot, thereby forming the three rope portions 5, 6 and 7 (see FIG. 6). The rope portion 8 then returns to the hook 4 and the remaining portions of the rope are used in a similar manner to form the radial portions 9, 11, 12 and 14 and the horizontal intermediate portions 10 and 13 as indicated in FIGS. 2 and 3.

Figure 4:
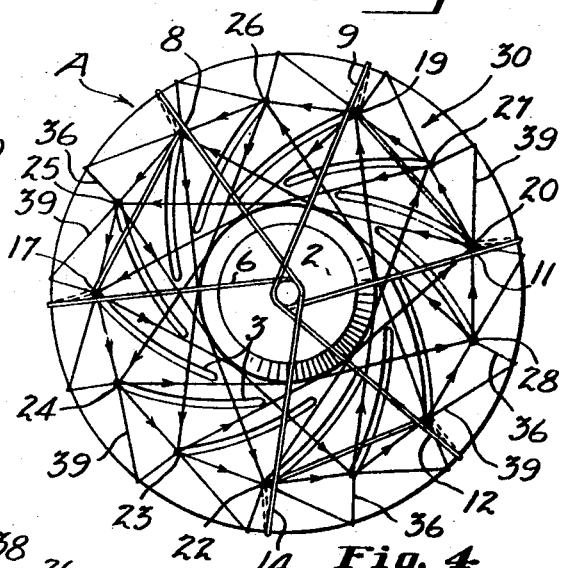
FIG. 4 is a schematic top plan view similar to FIG. 3 but showing the positions of reinforcing ropes forming a network on the top of the pattern.
Figure 5:
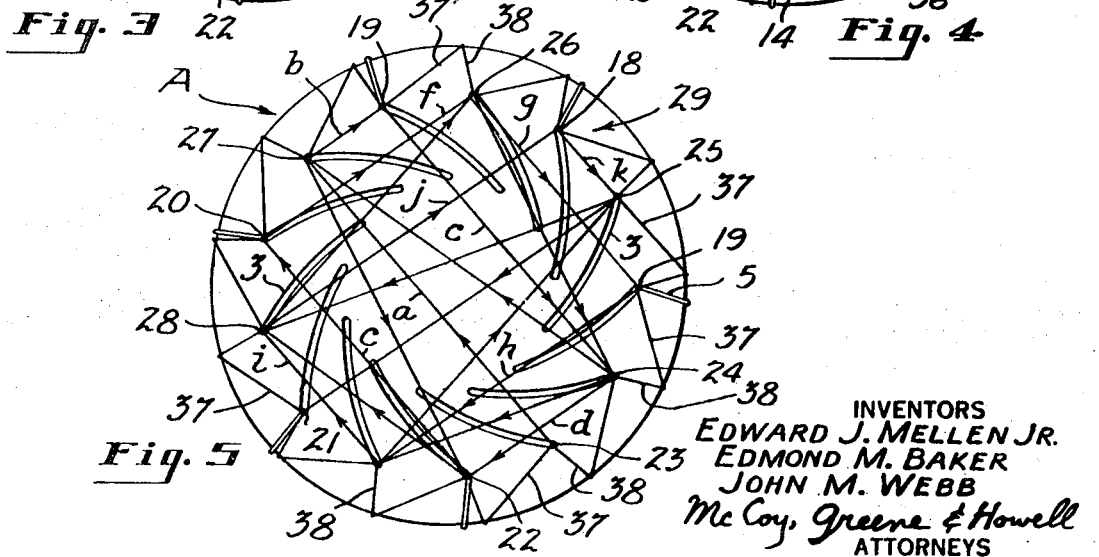
FIG. 5 is a schematic bottom view of the rope-reinforced pattern of FIG. 4 showing the rope network on the bottom surface of the pattern.

As shown diagrammatically in FIGS. 4 and 5, a rope network 29 is formed on the flat bottom surface of the pattern and a rope network 30 is formed on the flat upper surface of the disc portion 1. While the rope should be sufficiently taut, it should not be so tight that it could distort the pattern or crack the mold. The various ropes of the network are shown schematically by solid lines, the arrows indicating the direction in which the rope may be extended when it is applied.

When applying the network, as shown in FIGS. 4 and 5, the twine or other rope is extended through the outer ends of the slots 3, identified by the numberals 21 through 28, and around portions of the pattern to provide short marginal rope portions 36 and 38 adjacent the upper and lower surfaces, respectively, of the disc portion 1 and longer marginal rope portions 37 and 39 adjacent the lower and upper surfaces, respectively, of said disc portion. The rope portions 36 through 39 thus provide points of attachment at the slot ends 21 through 38.

It can readily be seen how a rope network may be formed by using such attaching points. Thus, as indicated in FIG. 5, for example, the network 29 is formed by extending one piece of rope from the slot end 23 to the end 27 to form the rope section a, extending it to end 19 to form section b, then extending it from 19 to 24 to form section c, and continuing to extend the rope past points 22, 20, 26, 17, 18 and 25 to form the rope sections d through k. Additional pieces of rope may be arranged in a generally similar manner to complete the network 29 as shown in FIG. 5. The network 30 may be formed in a similar manner on the upper surface of the disc portion 1 using the attaching points 21 through 28 at said upper surface as shown in FIG. 4. Portions of the rope may extend around the hub 2 to reinforce the pattern in this area, but this is not essential.

After the rope networks are applied to the upper and lower surfaces of the destructible pattern, the additional layers of ceramic material necessary to give the shell mold the desired thickness are applied in the conventional manner as described in more detail hereinafter, preferably after sprinkling short destructible threads or fibers over the pattern. The finished shell mold is shown in FIGS. 7 and 8 as it appears prior to removal of the pattern and firing of the mold.

The process of this invention is particularly well suited for use with wax patterns but may be used with patterns made of synthetic resins, mercury, mercury alloys or other destructible materials. Any conventional ceramic materials and binders may be employed to make the shell molds of this invention. Suitable ceramic slurries are disclosed, for example, in the following United States Pat. Nos. 2,806,269; 2,818,619; 2,911,310; 2,913,729; 2,961,751; 2,932,864; 3,160,931; and 3,222,435.

In order to obtain a good surface finish on the casting, it is desirable to use refractory granules in the prime dip and the first dusting operation which are much finer than those used in the later-applied concrete dip slurries. Thus, all of the refractory particles used in the prime dip slurry may, for example be small enough to pass through a 200-mesh sieve. However, the refractory material of the concrete dip slurry may, for example, be such that no more than 50 percent by weight can pass through a 200-mesh sieve and the remainder will pass through a 50-mesh sieve.

The refractory material used in each slurry may be any conventional ceramic material used for making shell molds including zirconite, fused silica, aluminum silicate, zirconium silicate, alumina, etc., and any conventional binder may be used, such as ethyl silicate, colloidal alumina, sodium silicate, colloidal zirconium, colloidal silica, etc. Both a low-temperature binder and a high-temperature binder may be employed as is well understood in the art.

The ceramic slurries may be applied by spraying or in any other suitable manner and may be dried in various ways with air or other gas. The preferred procedure is to dip the destructible pattern in the slurry and to evaporate the water or other slurry vehicle in air having a predetermined humidity and temperature. When using wax patterns it is desirable to effect dusting and drying using the process of U.S. Pat. No. 2,932,864 or U.S. Pat. No. 3,307,232.

The term "drying" is used herein in the normal sense to describe the evaporation of most of the slurry vehicle and does not require removal of 100 percent of the liquid. The amount of drying should be sufficient to permit proper application of the next ceramic layer as is well understood in the art.

Although the ceramic slurry used for forming shell molds on the wax patterns may be any of the conventional materials used for this purpose, it is necessary to provide a slurry of the proper consistency. If a slurry is too thick, this can cause building up the thickness of the layers on the mold too rapidly. If, for example, the slurry contains too much of an organic material, such as a synthetic resin, it may be unsatisfactory. For this reason such resins are preferably omitted and, if used, are used in very small amounts.

Conventional hydrolyzed solutions of ethyl silicate are excellent for use in practicing the present invention although colloidal silica binders and various other binders also provide excellent results. The ethyl silicate type of binder usually comprises about 30 to 60 percent by weight of ethyl silicate (about 30 to 40 percent $SiO_2$), about 30 to 60 percent alcohol, about 0.5 to 0.5 percent concentrated hydrochloric acid, and about 1 to 10 percent of water. One part by weight of such binder is usually mixed with about 2.5 to 4.5 parts by weight of the dry refractory material. Various catalysts and/or accelerators may be employed with the ethyl silicate binder including magnesium oxide, aluminum oxide, aluminum hydroxide, ammonium carbonate, ammonium acetate, morpholine, etc. Each ceramic layer of the shell mold made by the process of this invention is preferably made by applying the slurry to the pattern, draining off the excess slurry, and applying a stucco coat before drying the layer in a suitable drying apparatus. The dusting steps speed up the formation of the shell mold, but it will be understood that dusting is not essential in the practice of this invention. It will also be apparent that any suitable method may be employed to evaporate the slurry vehicle from the individual ceramic layers and that each layer does not have to be dried 100% before applying the next layer. It is preferred to dry the mold rapidly using equipment of the type disclosed in said U.S. Pat. No. 2,932,864, Patent No. 3,191,250 or U.S. Pat. No. 3,307,232.

In practicing the process of the present invention, a typical procedure is to apply one or two prime dip layers to the removable or destructible pattern before applying the reinforcing rope or the destructible threads, each layer being formed by dipping the destructible pattern in the prime dip slurry, draining the excess slurry, dusting with fine ceramic particles, and drying the individual layer in air or other gas. After the second layer is dried, the pattern may be dipped in the concrete slurry or the prime dip slurry, just prior to the application of the destructible threads. If reinforcing ropes are to be employed, then these may be applied before the flocking operation is performed. After the pattern has been covered with the destructible fibers, conventional air drying may be employed, with or without dusting. Thereafter several ceramic layers are preferably built up over the destructible threads or the reinforcing rope (or both) in a conventional manner to provide the shell mold with the desired thickness. The total number of layers may vary from four to 10 or more. Usually each of the concrete slurry layers is formed by dipping the pattern in the concrete slurry, draining off the excess slurry, dusting with coarse refractory particles, and evaporating the slurry vehicle with air. Dusting is preferably omitted after the last dip coat. In some cases post-fired dip coats may be used.

The twine or other rope and the short threads or filaments used in making the permeable rope-reinforced molds may be formed of various destructible materials, such as natural and synthetic fibers. The fibrous material may be hair, straw, grass, hemp, jute, sisal, bassine or other fibers of vegetable, mineral or animal origin. The fibrous material may be a protein fiber, such as one made from casein, soybeans, peanuts or corn; a cellulosic fiber, such as viscose rayon; or various other natural or synthetic fibers disclosed in our copending application Ser. No. 781,069. The short threads or filaments may also be made from quartz glass, fused silica or other ceramic, polystyrene, polyethylene, polyvinyl alcohol, cellulose acetate, cellulose butyrate, ethyl cellulose, acetate butyrate, polyamides such as nylon, vinyl resins, polyester resins, polyacrylic resins, natural rubber, synthetic rubbers, acetate rayon, polycaprolactam, or the like. The threads or filaments used in making the shell molds of this invention may be microbore quartz glass tubes or ceramic tubes of small diameter (e.g., a diameter of 0.04 to 0.1 inch) and need not be destructible. Such threads or filaments may be hollow or solid and may be only partially destructible. They may be common textile fibers or metal filaments which are chemically treated or coated with wax, ceramic or any other suitable material, such as a synthetic resin.

The metal used to form the rope or twine or the threads or filaments may be aluminum, brass, steel, iron, etc. It may, for example, be black iron or metal with a low coefficient of expansion, such as a non-expanding stainless steel. Good results can be obtained by using wires or filaments made of a metal treated to form an oxide film on the surface. It will be understood, however, that metal wires or other heat conductive filaments are not desirable where it is necessary to obtain good thermal insulating properties.

If the destructible material used to form the threads or fibers used in reinforcing the molds of this invention is not sufficiently stiff or does not retain its stiffness after dipping in the ceramic slurry, the threads may become matted or flattened on the surface of the coated pattern. This could cause serious defects in the mold by interfering with the adhesion of subsequent ceramic layers. Therefore, when using a material which does not remain stiff, the individual threadlike fibers or filaments should be treated or reinforced to provide or maintain adequate stiffness as by coating with a synthetic resin or other suitable material. Of course, such treatment may be unnecessary when using stiff fibers, such as those made of hemp, jute, sisal, bassine, Tampico, straw or the like.

Where the vehicle of the slurry has a softening action on the fibers which causes them to bend, the fibers may be coated to prevent such softening action. For example, the fibers can be coated to provide water resistance if a colloidal silica binder and an aqueus ceramic slurry are provided.

The threadlike fibers or filaments may be applied to the surface of the partially formed shell mold in various ways. They may be applied by a sprinkling or flocking process or may be guided or directed toward the mold surface at high velocity like arrows by shooting them from guns or by various other means. They may be applied manually but are preferably applied by suitable mass production methods to minimize costs. The cost of applying the fibers to the shell mold is minimized because a single application of fibers is usually sufficient to provide the desired wall construction. It is not necessary to apply the fibers more than once in order to obtain the needed wall thickness or thermal insulating properties.

In practicing the process of this invention, threadlike fibers or filaments are used with a length of 0.4 inch to 1 inch or so having sufficient stiffness so as to remain generally in outwardly projecting positions when subsequent layers of ceramic material are applied, whereby the individual threads project outwardly a distance greater than the total thickness of several layers of ceramic material and provide a porcupine configuration which helps to prevent separation of the layers. Although minor amounts of fibers with a length of one-fourth inch or somewhat less can be used in the practice of this invention, it is preferable to eliminate extremely short fibers because of the tendency to lay flat on the surface and to interfere with the adhesion of the next ceramic layer. Best results are obtained when a majority of the threadlike fibers or filaments have a length of 0.4 inch to 1 inch.

To facilitate an understanding of the present invention, an example of the process of this invention is given below. In this example a liquid carrier of prehydrolyzed ethyl silicate is prepared by mixing 5300 milliliters of ethyl silicate 40 (about 40 percent $SiO_2$) with 4200 milliliters of ethyl alcohol and 500 milliliters of 1 percent hydrochloric acid. One part by weight of the resulting liquid carrier is then thoroughly mixed with 3 parts by weight of a conventional dry mix consisting of 65 percent by weight of zircon flour and 35 percent by weight of fused silica flour. Said flours are of a size to pass through a 325-mesh screen (standard Tyler sieve). The resulting ceramic slurry is employed as a prime dip slurry as indicated below.

In order to provide a concrete dip slurry containing a coarser refractory, the prehydrolyzed ethyl silicate prepared as indicated above is mixed with a coarse fused silica flour which will pass through a 120-mesh sieve. About one part by weight of the prehydrolyzed ethyl silicate solution is mixed with around 3 parts of the coarse silica flour and preferably with an amount which will provide a viscosity of 14 to 16 seconds using a standard number 4 Zahn cup.

In forming the shell mold of this invention, the wax pattern A of FIG. 1 is immersed in a dip tank containing the prime dip slurry described above, the solids preferably being kept in suspension (i.e., by rotating the tank continuously at a speed of about 30 rpm). After dipping, the pattern is given a stucco coat and is air dried according to the method of said U.S. Pat. No. 2,932,864. The dry refractory used for the first stucco coat is conventional and comprises 62.5 percent by weight of fused silica (−50 +100 mesh) and 37.5 percent by weight of zircon sand (−80 +200 mesh). After the first dipping, dusting and drying operation, the pattern is again dipped in the same prime dip slurry, dusted with the same dry refractory material and air dried in the same way, and a ⅛-inch hemp twine (two-strand binder's twine) is mounted on the pattern over the resulting ceramic coating 15 as indicated in FIGS. 2 to 6.

After the hemp twine is applied, the rope-reinforced pattern is dipped, for example, in a rotating dip tank containing the concrete dip slurry described above, and a stucco coat is applied by dusting using a suitable apparatus as disclosed in said U.S. Pat. No. 2,932,864 but using a coarser refractory of a conventional type made by mixing 3 parts by weight of fused silica grains (−30 +50 mesh) with 4 parts of calcined clay or grog (i.e., aluminum silicate). Of course, any coarse stucco material conventionally used for this purpose may be employed.

After the stucco is applied, air drying is effected according to the process of said U.S. Pat. No. 2,932,864, and the pattern is again dipped in the same concrete slurry. Then the wet coated pattern is flocked by sprinkling ordinary bassine fibers with a length of about one-half inch over the entire outer surface of the coated pattern in such a manner that the fibers adhere to the wet ceramic outer layer and project outwardly therefrom. The application of the fibers may be effected using a conventional rotary dusting apparatus, such as that disclosed in said U.S. Pat. No. 2,932,864, having buckets rotating with the drum which drop or sprinkle the fibers over the pattern. The pattern may be rotated by hand as the fibers have been deposited on the wet surface, the pattern is again dipped in the concrete slurry, the excess slurry is drained off, and the wet pattern is dusted with the coarse ceramic particles and dried as before.

The dipping in the concrete slurry, the dusting with ceramic particles and the drying may be repeated to build up a total of 10 layers or so. Then the pattern is dipped in a ceramic slurry and dried without dusting to provide a final seal coat. The resulting shell mold is relatively thick in the vicinity of the individual rope sections and has a very irregular outer surface because of the projecting fibers 31 which project outwardly in all directions. FIG. 7 gives a general idea of the irregular shape of the shell mold prior to firing, it being understood that there are an infinite number of variations in the shape depending on the way in which the ropes and fibers are located.

As indicated in FIG. 7, the reinforcing ropes of the network 30 are located near the upper surface 33 of the pattern and the ropes of the network 29 are located a short distance below the lower surface 34 of the pattern, the fibers 31 being closely spaced throughout the shell mold and providing a multiplicity of closely spaced projections 32 in the outer surface, said projections extending in all directions in a random fashion. Where the supporting rope sections 6 to 14 are employed, the radially extending sections will also be coated with refractory material to provide radial arms, such as the arms 6a, 11a, 12a and 14a.

The dried shell mold made as described above is then flash fired in a conventional manner at 1850° F. to effect removal of the wax and cooled to room temperature. This heating burns out the rope and the bassine fibers. However, the rope retains its strength longer than the wax and reinforces the mold so as to prevent cracking of the mold (i.e., due to expansion of the wax). The strength of the rope is not the only important factor, however, as the presence of the rope results in an increase of the thickness and strength of the mold walls.

The completed shell mold has exceptional properties and need not be preheated to effect casting of the metal as with conventional shell molds. Instead the metal may be poured into the mold while the mold is at room temperature. After pouring, the mold is cooled and the shell is broken away from the cast metal part.

Prior to this invention the conventional shell molds often required higher pouring temperatures and preheating of the molds before metal casting. It was conventional to preheat the shell molds to about 1800° F. when pouring the metal at around 3000° F. The disadvantage of the preheating is that it requires an extra heating operation and sometimes tends to cause a reaction between the metal being cast and the material forming the mold. The process of this invention eliminates the need for the preheating operation and eliminates the metal mold reaction. Such preheating was necessary with conventional shell molds to facilitate removal of moisture and removal of air from the mold. This is not necessary with a porous mold of the type described in conjunction with FIGS. 1 to 8 of the greater porosity of the mold caused by the ropes and fibers which burn out to leave voids in the wall of the mold and the reduced thickness of the shell between rope sections. because of Highly porous molds made by the type of procedure described above are particularly good because they permit reduction in the metal pouring temperature. High pouring temperatures are undesirable for several reasons. For example, at high temperatures, some of the elements of the alloys, such as titanium or carbon, might be lost due to reaction with the container in which they were melted and other materials may be lost by vaporization. The hotter metal also tends to conform too closely to the rough surface of the mold cavity and to provide the casting with a correspondingly rough surface. The porous molds of the present invention permit pouring of the metal and complete filling of the mold cavity when using lower pouring temperatures. The advantages of such lower temperatures are finer grain size, increased strength and better metal properties. There is produced a smoother surface on the casting, and there is less tendency of the metal to run into depressions or vent openings of the mold, such as those produced by the randomly disposed brush fibers.

Shell molds made by the process of this invention have other advantages. Because of the exceptionally strong wall structure, it is unnecessary to provide a backing for the shell mold when casting the metal. This advantage is obtained when using the destructible fibers or hollow filaments even without a rope reinforcement of the type disclosed, for example, in FIGS. 2 to 8. The threadlike voids produced by the burned-out fibers or hollow filaments can be used as insulating air spaces and are highly advantageous where a thermally insulated mold is needed.

FIGS. 9 and 10 illustrate manufacture of a porcupine-type shell mold using destructible threadlike fibers. These figures illustrate use of a conventional wax pattern B in the form of a tree or cluster, it being understood that other conventional patterns are also suitable. The pattern B has a tapered central portion 51 of circular cross section having embedded therein a supporting hook 50. The pattern has a series of pattern members 52 of circular cross section regularly spaced around the circumference of the pattern B and held in position by a series of connecting portions 53 and a circular base portion 54. The pattern B is conventional and forms no part of this invention.

Two additional examples of the process of this invention are given below in which threadlike fibers are employed to provide the porcupine-type configuration. In each of these additional examples the prime dip slurry and the concrete dip slurry are the same as used in the previous example, and the stucco is applied to each prime layer and each concrete layer as previously described in that example.

The first of these additional examples relates to formation of a highly permeable shell mold. In this example, the pattern B or other suitable pattern is dipped in the prime dip slurry, the excess slurry is drained off, a stucco coat is applied by dusting, using the fine ceramic material described above, and the coated pattern is air dried as described in the previous example. The dipping, draining, dusting and drying is repeated to form a second prime dip layer. Then the pattern B is dipped in the rotating dip tank containing the concrete dip slurry described above, the excess slurry is drained off and slurry, -inch bassine fibers 56 are sprinkled over the entire outer surface of the pattern by the method of the previous example so that the fibers project outwardly from the surface and do not interfere with adhesion of subsequent layers. The wet coated pattern is then air dried, and seven layers of concrete slurry are applied to complete the mold as shown in FIG. 10. Each concrete layer is applied in the conventional manner by dipping in the concrete ceramic slurry, draining off the excess slurry, dusting with the coarse ceramic particles described above, and air drying in the usual manner. The dusting operation is omitted when the last seal coat is applied.

The resulting shell mold is then flash fired at 1850° F. to effect wax removal. The mold is then cooled to room temperature, and the molten metal is poured into the mold to form the desired metal casting. The second of these additional examples relates to formation of an unbacked, thermally insulated mold. In this example, the pattern B or other pattern is provided with two prime coats by the dipping, dusting and drying procedures of the previous examples and is then provided with three concrete layers before applying the threadlike fibers. Each concrete layer is formed as described in the previous examples by dipping in the concrete slurry of the rotating dip tank, draining off the excess slurry, dusting with the coarse ceramic particles, and air drying. After the third concrete layer is air dried, the coated pattern is again dipped in the concrete slurry of the rotating dip tank, the excess slurry is drained off, and ½-inch Tampico fibers (56) are sprinkled over the entire outer surface of the pattern by the method described in the previous example so that the fibers project outwardly from the surface. The wet coated pattern is then air dried, and two more concrete layers are applied by the dipping, dusting and drying operations described above. After the last of these concrete layers is air dried, the coated pattern is dipped in a ceramic slurry and dried without dusting to provide a final seal coat.

The dried shell mold thus formed is then flash fired at 1850°F. to destroy the wax pattern and burn out the Tampico fibers. The resulting unbacked shell mold has relatively thick, strong walls and threadlike voids which provide good thermal insulation (see FIG. 10). An unbacked shell mold of this type is suitable for use in a conventional roll-over furnace and for other uses where thermal insulation is needed. It also permits use of relatively short firing cycles.

The thermally insulated mold of this example can be preheated prior to pouring of the metal and will retain substantially uniform temperature because of the threadlike insulating air spaces provided by the fibers.

The Tampico fibers are not as stiff as bassine fibers but are excellent because they are lighter and can remain in outwardly projecting positions with less tendency to fall and lay flat because of their weight. When such Tampico fibers are wet with the ceramic slurry, they bend somewhat but still function effectively to facilitate buildup of wall thickness without unduly interfering with adhesion.

It will be understood that the thermal insulation and/or the final seal coat may be provided after the shell mold is fired. In this instance, the fired shell mold might be cooled, dipped in the ceramic slurry, and then flocked with the threadlike fibers to provide the porcupine configuration. Thereafter, a few more layers of ceramic could be applied by dipping, dusting and drying operations and the mold could be fired again to burn out the fibers.

By using threadlike fibers with a length of 0.4 inch or greater it is possible to build up the wall thickness at a remarkable rate. Without the fibers, the thickness of each ceramic layer of the shell mold is substantially less than 0.05 inch. A ten-layer mold may have a wall thickness of only 0.2 inch or so. By applying ½-inch Tampico fibers, it is possible to obtain a single layer of relatively low density having an average thickness substantially greater than 0.10 inch. Because of this extremely rapid buildup of wall thickness without adding excessive weight, it is possible to obtain adequate wall strength and adequate thermal insulation economically with only a single application of the fibers followed by just a few subsequent dipping and drying operations. It is not necessary to weaken the mold or to provide an excessive number of voids in the mold by several applications of the fibers and it is not necessary to provide excessive mold weight in order to obtain adequate thermal insulation and/or wall thickness.

When forming thermally insulated molds by the process of this invention, it is preferable to build up four to 10 refractory layers on the wax pattern by repeated dipping, dusting and drying operations, as disclosed above or in said U.S. Pat. No. 2,932,864, before applying the stiff threadlike fibers or filaments. The first layer or layers is preferably a prime layer containing fine refractory particles and the subsequent layers are preferably concrete layers containing coarser particles.

After the four to 10 layers are built up on the wax pattern, the threadlike fibers or filaments are adhered to the outer layer in outwardly projecting positions in any suitable manner. One application of such fibers or filaments is sufficient. Thereafter, it is usually preferable to build up only one to three more refractory layers (by dipping and drying as before) and then to apply a conventional final seal coat which may contain fine refractory particles. Wax removal and firing preferably takes place after all of the ceramic layers have been applied and at a temperature of 1500° to 2100°F., preferably 1700° to 2000°F. However, the filaments or the seal coat can be applied after wax removal.

While the process of this invention is usually applied to the making of the more common types of investment shell molds it will be understood that it may be applied to crucibles used in induction furnaces for melting the metal, to ladles used to transport the molten metal from the furnace to the refractory molds and to other refractory articles.

The present invention may be practiced using any of the known binder systems and any of the known types of destructible patterns including frozen mercury patterns. The gelling of the ethyl silicate may, for example, be effected by use of ammonia vapors. Excellent shell molds may, for example, be made by the alternate dip method wherein each ceramic layer formed from the ethyl silicate slurry is followed by a layer formed from a colloidal silica slurry.

Unless the context shows otherwise, all percentages given herein are by weight and "parts" means parts by weight.

It will be understood that the above description is by way of illustration rather than limitation and that, in accordance with the provisions of the patent laws, variations and modifications of the specific compositions, methods and products disclosed herein may be made without departing from the spirit of the invention.

Having described our invention, we claim:

1. A process for manufacture of unbacked porcupine shell molds with substantial wall thickness comprising dipping a destructible pattern of a predetermined shape in a ceramic slurry containing a liquid vehicle, finely divided refractory particles and a heat-setting binder, dusting the resulting ceramic layer with refractory particles to provide a stucco coat, and drying such ceramic layer; repeating the dipping, dusting and drying operations to build up at least 3 refractory layers on the pattern; thereafter adhering stiff destructible threads to the outer layer in closely spaced relation throughout the outer layer of the shell mold, said threads having a length of about 0.4 inch to about 1 inch and being held in outwardly projecting positions; thereafter forming additional refractory layers by dipping the shell mold in a ceramic slurry to cover said threads and to cause the outer ceramic layers to form projections conforming to the shape of said threads; and firing the resulting porcupine shell mold to burn out said threads and thereby form threadlike voids in said mold.

2. A process as defined in claim 1 wherein said threads comprise organic fibers and substantially all of said threads are applied in a single operation prior to the next application of the ceramic slurry.

3. A process as defined in claim 2 wherein said threads comprise Tampico fibers and are sprinkled on the outer surface of the shell mold during said single operation.

4. A process of making an unbacked porcupine shell mold of the character described for casting metal without a backing comprising the steps of dipping a destructible pattern of a predetermined shape in a ceramic slurry containing a liquid vehicle, finely divided refractory particles and a heat-setting binder, dusting the resulting ceramic layer with refractory particles, and drying said ceramic layer; repeating the dripping, dusting and drying operations to build up a plurality of refractory layers on the pattern; thereafter adhering stiff destructible threads to the outer layers of the shell mold in closely spaced randomly disposed relation throughout said outer layer while the mold is free of other reinforcing members so that all of the refractory layers then formed conform to the shape of the mold cavity, said threads having a length of about 0.4 inch to about 1 inch and being held in outwardly projecting positions; thereafter forming a plurality of additional refractory layers which cover the threads and form projections conforming to the shape of said threads; and firing the resulting porcupine shell mold to burn out said threads and thereby form threadlike voids in the walls of said mold.

5. An unbacked porcupine shell mold formed in accordance with claim 4 for casting molten metal comprising a thick refractory body with an inner refractory layer forming a smooth internal surface defining a mold cavity of a predetermined shape and an outer refractory layer having a porcupine-like configuration, said body having inner refractory layers which conform substantially to the shape of said mold cavity and a multiplicity of closely spaced thread-like voids randomly distributed throughout said body outwardly of said inner layers, said voids having a length of about 0.4 to about 1 inch, extending radially outwardly, and being covered by additional refractory layers which conform generally to the contour of said threadlike voids and project outwardly in the vicinity of said voids, said shell mold being free of rope reinforcement.

* * * * *